(12) United States Patent
Okitsu

(10) Patent No.: US 11,287,696 B2
(45) Date of Patent: Mar. 29, 2022

(54) LIQUID CRYSTAL DISPLAY MODULE

(71) Applicant: SHARP KABUSHIKI KAISHA, Sakai (JP)

(72) Inventor: Motoaki Okitsu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/369,603

(22) Filed: Jul. 7, 2021

(65) Prior Publication Data

US 2022/0011635 A1 Jan. 13, 2022

Related U.S. Application Data

(60) Provisional application No. 63/050,015, filed on Jul. 9, 2020.

(51) Int. Cl.
*G02F 1/13357* (2006.01)
*G02F 1/1333* (2006.01)

(52) U.S. Cl.
CPC .. *G02F 1/133608* (2013.01); *G02F 1/133314* (2021.01); *G02F 1/133603* (2013.01); *G02F 1/133605* (2013.01)

(58) Field of Classification Search
CPC ......... G02F 1/133608; G02F 1/133314; G02F 1/133603; G02F 1/133605

USPC ...................................................... 349/58–71
See application file for complete search history.

(56) References Cited

U.S. PATENT DOCUMENTS

2017/0153499 A1 6/2017 Yang
2019/0113808 A1* 4/2019 Isono .................. G09F 9/00

FOREIGN PATENT DOCUMENTS

JP   2016-177965 A   10/2016
WO  2017/017819 A1   2/2017

* cited by examiner

*Primary Examiner* — Charles S Chang
(74) *Attorney, Agent, or Firm* — ScienBiziP, P.C.

(57) ABSTRACT

A liquid crystal display module includes: a liquid crystal panel; a back chassis having a bottom that supports a substrate, the substrate having a plurality of light sources; a frame having four independent wall members respectively extending in parallel to four sides of the liquid crystal panel, the frame supporting the liquid crystal panel; a bezel having four independent plate-like members disposed so as to surround the four sides of the liquid crystal panel and the four independent wall members; an optical film laminate disposed between the liquid crystal panel and the frame; a first reflective sheet opposed to the four independent wall members, and having a bottom face that has a plurality of apertures through which the plurality of light sources are respectively exposed; and four independent second reflective sheets disposed between the liquid crystal panel and the respective four independent wall members.

11 Claims, 13 Drawing Sheets

PRESSURIZATION 0    PRESSURIZATION 1    PRESSURIZATION 2    PRESSURIZATION 3

LIQUID CRYSTAL DISPLAY MODULE

This application claims priority under 35 USC § 119(e) to U.S. Provisional Application No. 63/050,015 filed on Jul. 9, 2020, the entire contents of which are hereby incorporated by reference.

BACKGROUND

1. Technical Field

The present invention relates to a liquid crystal display module.

2. Description of the Related Art

A liquid crystal display module, in which a liquid crystal display panel (hereinafter referred to as a "liquid crystal panel" for simplicity) and a backlight unit are housed within a bezel, generally includes: a panel chassis that supports (or retains) the liquid crystal panel and an optical sheet(s); and a back chassis that supports (or retains) the backlight unit.

For example, a liquid crystal display apparatus described in Japanese Laid-Open Patent Publication No. 2016-177965 hereinafter "Patent Document 1") includes a chassis (corresponding to the aforementioned back chassis) that supports a direct-type backlight and a panel chassis that supports the liquid crystal panel. The chassis, shaped as a shallow-bottomed box, has a flange portion protruding outward from side plates, such that a reflection plate and a diffusion plate are interposed between the flange portion and the panel chassis. On a bottom plate of the chassis, pins for supporting the diffusion plate are monolithically formed. An optical sheet such as a prism sheet is disposed on the diffusion plate.

SUMMARY

Conventionally, when producing a liquid crystal display module with a liquid crystal panel of a different size, or with a different distance (optical distance: OD) between the light source in its backlight unit (e.g., a substrate surface on which LEDs are mounted) and the liquid crystal panel, the panel chassis and the back chassis also were newly designed and produced for obvious reasons. Then, manufacturing a wide variety of liquid crystal display modules in small quantities would result in a large portion of the product price being ascribable to the cost of design and/or manufacture. In particular, the cost of a die will be reflected in the price of any part (e.g., a chassis) that is produced by using the die, and this is likely to cause a cost increase associated with the manufacture of a wide variety of products in small quantities.

The present invention has been made in view of the above problem, and an objective thereof is to provide a liquid crystal display module with a reduced cost, and in particular a liquid crystal display module with a reduced cost increase associated with the manufacture of a wide variety of products in small quantities.

According to embodiments of the present invention, solutions as recited in the following Items are provided.

[Item 1]

A liquid crystal display module comprising:
a liquid crystal panel;
a back chassis having a bottom that supports a substrate, the substrate having a plurality of light sources disposed thereon;
a frame having four independent wall members respectively extending in parallel to four sides of the liquid crystal panel and each being fixed at a perimeter of the back chassis, the frame supporting the liquid crystal panel;
a bezel having four independent plate-like members disposed so as to surround the four sides of the liquid crystal panel and the four independent wall members of the frame;
an optical film laminate disposed between the liquid crystal panel and the frame, and being attached onto a rear face of the liquid crystal panel;
a first reflective sheet having four side faces opposed to the four independent wall members of the frame, and having a bottom face that has a plurality of apertures through which the plurality of light sources are respectively exposed; and
four independent second reflective sheets disposed between the liquid crystal panel and the respective four independent wall members of the frame.

The back chassis may further have four edge portions respectively extending in parallel to the four sides of the liquid crystal panel and protruding from the bottom toward the liquid crystal panel; and
the four independent wall members may respectively be fixed to the four edge portions of the back chassis.

The frame may substantially define a distance between the liquid crystal panel and the bottom of the back chassis.

[Item 2]

The liquid crystal display module of Item 1, wherein the four independent wall members have mutually congruent cross-sectional shapes.

[Item 3]

The liquid crystal display module of Item 1 or 2, wherein the first reflective sheet and the four independent second reflective sheets are overlaid upon one another on the four independent wall members.

[Item 4]

The liquid crystal display module of any one of Items 1 to 3, wherein an end portion of each of the four independent wall members has a 45° beveled face, and is fixed so that the beveled faces of two adjacent wall members are opposed to each other.

[Item 5]

The liquid crystal display module of any one of Items 1 to 3, wherein, in each of the four corners created by two adjacent wall members among the four independent wall members, an end portion of one of the wall members is disposed in the other wall member.

[Item 6]

The liquid crystal display module of any one of Items 1 to 5, wherein the four independent plate-like members of the bezel are each configured so that, when a lower portion that is directly in contact with or indirectly fixed to the frame is displaced, an amount of displacement of an upper portion that is directly in contact with or indirectly fixed to the liquid crystal panel is smaller than an amount of displacement of the lower portion. For example, the four independent plate-like members of the bezel may be configured so that the upper portion that is directly in contact with or indirectly fixed to the liquid crystal panel is able to easily undergo elastic deformation with respect to the lower portion that is directly in contact with or indirectly fixed to the frame.

[Item 7]

The liquid crystal display module of Item 6, wherein the upper portion and the lower portion of each of the four independent plate-like members of the bezel are two mutually independent plate members being adhesively bonded to each other via an elastic member.

[Item 8]

The liquid crystal display module of any one of Items 1 to 5, wherein each of the four independent plate-like members of the bezel is a monolithically-formed plate-like member having a throughhole, the plate-like member being fixed to the frame with a stepped screw that is inserted in the throughhole with a spring member interposed therebetween. Two or more said throughholes may be provided in the plate-like member, so that the plate-like member is fixed to the frame in two or more places.

[Item 9]

The liquid crystal display module of any one of Items 1 to 8, further comprising a corner-protecting member covering an interspace between the four independent plate-like members of the bezel and the back chassis.

[Item 10]

The liquid crystal display module of Item 9, wherein the corner-protecting member is made of a rubber.

[Item 11]

The liquid crystal display module of any one of Items 1 to 10, wherein each of the four independent second reflective sheets is arranged to cover an upper top end of a corresponding wall member among the four independent wall members, and the liquid crystal panel is supported by the four independent wall members through the four independent second reflective sheets.

According to an embodiment of the present invention, a liquid crystal display module with a reduced cost is provided. According to an embodiment of the present invention, in particular, a cost increase associated with the manufacture of a wide variety of products in small quantities is suppressed.

BRIEF DESCRIPTION OF THE DRAWINGS

FIG. 5 is a schematic partial cross-sectional view of a liquid crystal display module 100a.

FIG. 6A is a schematic partial cross-sectional view of the liquid crystal display module 100a.

DETAILED DESCRIPTION

Figure 1A:
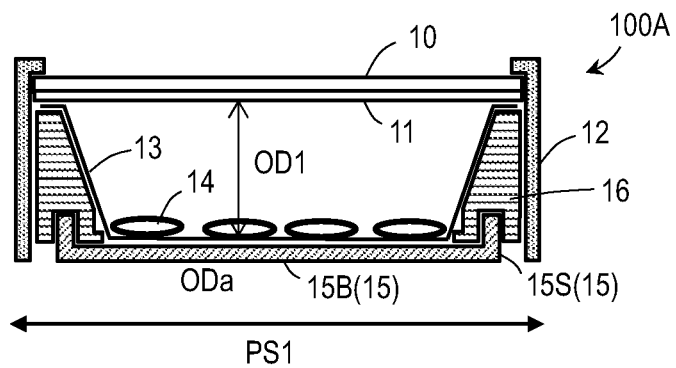
FIG. 1A is a schematic cross-sectional view of a liquid crystal display module 100A according to an embodiment of the present invention.

Hereinafter, with reference to the drawings, liquid crystal display modules according to embodiments of the present invention will be described. Note that liquid crystal display modules according to embodiments of the present invention are not to be limited to what is exemplified below.

First, with reference to FIG. 2, the configuration of a liquid crystal display module 900 according to Comparative Example will be described. In the following figures, like reference numerals will basically be given to components of like functions, with their descriptions occasionally omitted.

Figure 2:
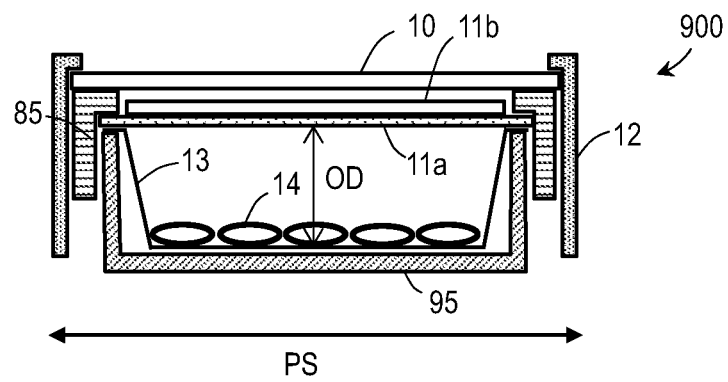
FIG. 2 is a schematic cross-sectional view of a liquid crystal display module 900 according to Comparative Example.

The liquid crystal display module 900 according to Comparative Example as shown in FIG. 2 is similar in structure to the aforementioned conventional liquid crystal display panel, and includes a liquid crystal panel 10, a diffusion plate 11a, an optical film laminate 11b, a bezel 12, a panel chassis 85, and a back chassis 95. The panel chassis 85 supports the liquid crystal panel 10, the diffusion plate 11a, and the optical film laminate 11b. The back chassis 95 supports LED substrates 14.

When producing a liquid crystal display module 900 with a liquid crystal panel 10 of a different size, or with a different distance (optical distance: OD) between the light sources on the LED substrates 14 and the liquid crystal panel 10, it is naturally necessary to newly design and produce the panel chassis 85 and the back chassis 95. Since the panel chassis 85 and the back chassis 95 are produced by using dies, when newly manufacturing a liquid crystal display module, investments in dies are needed each time. If the die cost is to be included in the part price, the smaller number of that product is produced, the higher the part price will be.

Next, with reference to FIGS. 1A, 1B, 1C and 1D, schematic structures of liquid crystal display modules 100A, 100B, 100C and 100D according to embodiments of the present invention will be described.

The liquid crystal display module 100A according to an embodiment of the present invention shown in FIG. 1A includes a liquid crystal panel 10, a back chassis 15, a frame 16, a bezel 12, an optical film laminate 11, and a reflective sheet 13. The liquid crystal display module 100A does not include the panel chassis 85 which belonged in the liquid crystal display module 900. Moreover, the back chassis 95 in the liquid crystal display module 900 is replaced by the back chassis 15 and the frame 16 in the liquid crystal display module 100A.

The back chassis 15 includes: a bottom 15B supporting substrates on which a plurality of light sources are disposed (which may be referred to as "light source substrates") 14; and four edge portions 15S (see edge portions 15Sa, 15Sb, 15Sc and 15Sd in FIG. 3B) respectively extending in parallel to the four sides of the liquid crystal panel 10 and protruding from the bottom 15B toward the liquid crystal panel 10. The back chassis 15 is produced by pressing a piece of aluminum or an aluminum alloy (e.g. with a thickness of 1.5 mm) by using a die, for example. In products that are allowed to weigh somewhat heavier, iron (e.g., a galvanized steel plate (SECC material) with a thickness of 0.8 mm to 1.0 mm) may be used.

The frame 16 includes four independent wall members 16a, 16b, 16c and 16d (see FIG. 3B) respectively extending in parallel to the four sides of the liquid crystal panel 10 and each being fixed at a perimeter of the back chassis 15, and supports the liquid crystal panel 10. The frame 16 substantially defines the distance between the liquid crystal panel 10 and the bottom 15B of the back chassis 15, i.e., the distance (optical distance OD1) between the light sources on the light source substrates 14 and the liquid crystal panel 10 (or the optical film laminate 11).

The optical film laminate 11 disposed between the frame 16 and the liquid crystal panel 10 is attached onto the rear face (i.e., the backlight side) of the liquid crystal panel 10 with an optical adhesive (which is meant to be inclusive of a "pressure-sensitive adhesive"), for example. Examples of the optical film laminate 11 include brightness enhancement films (BEF), prism sheets, and microlens sheets. The optical film laminate 11 has the light-diffusing function of the diffusion plate 11a shown in FIG. 2. Such an optical film or optical sheet may be adhesively bonded by using an optical adhesive.

The back chassis 15 is produced through pressing with a die, but the four independent wall members 16a, 16b, 16c and 16d composing the frame 16 may be produced through extrusion molding. Therefore, when manufacturing liquid crystal display modules of different sizes (PS), for example, it is necessary to newly produce a die for the back chassis 15; however, under an optical design that straightforwardly utilizes the cross-sectional shapes of the four independent wall members 16a, 16b, 16c and 16d, so long as their cross-sectional shapes are congruent with one another, the same extrusion die can be consistently used to provide extrusions from which to form the wall members 16a, 16b, 16c and 16d. An extrusion die ("die") is less expensive than a pressing die, and, moreover, the four independent wall members 16a, 16b, 16c and 16d can be produced from extrusions that are obtained with a single extrusion die, thus allowing for a large cost reduction. The wall members 16a, 16b, 16c and 16d are made of aluminum or an aluminum alloy, for example.

The bezel 12 includes four independent plate-like members 12a, 12b, 12c and 12d (see FIG. 3B), which are disposed so as to surround the four sides of the liquid crystal panel 10 and the four wall members 16a, 16b, 16c and 16d of the frame 16. The four plate-like members 12a, 12b, 12c and 12d may be, for example, aligned at the corners without any interconnecting members in between, but fixed to one another by using screws, so as to become as one.

As will be described later with reference to FIG. 3C, the reflective sheet 13 is composed of five portions: a first reflective sheet 13m, having four side faces opposed to the four independent wall members 16a, 16b, 16c and 16d of the frame 16 and a bottom face having a plurality of apertures through which the plurality of light sources are respectively exposed; and four independent second reflective sheets 13a, 13b, 13c and 13d disposed respectively between the four wall members 16a, 16b, 16c and 16d of the frame 16 and the liquid crystal panel 10.

Figure 1B:
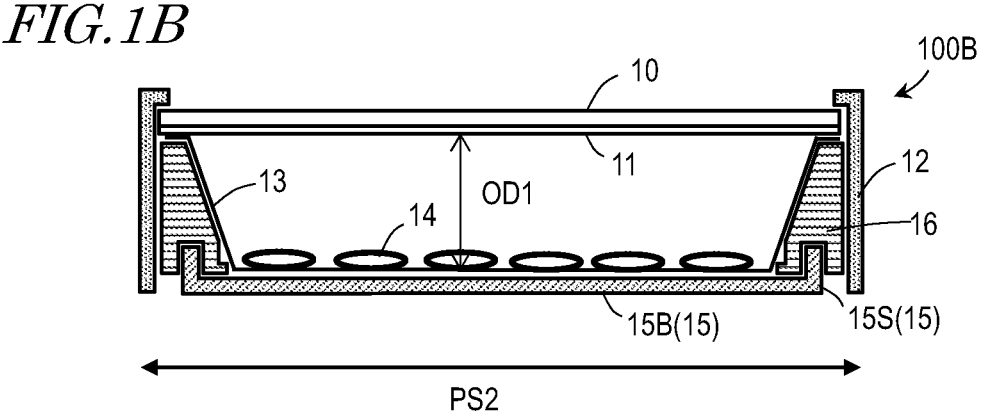
FIG. 1B is a schematic cross-sectional view of another liquid crystal display module 100B according to an embodiment of the present invention.

The liquid crystal display module 100B shown in FIG. 1B has a panel size PS2 which is larger than the panel size PS1 of the liquid crystal display module 100A shown in FIG. 1A, and the distance (optical distance OD1) between the light sources on the light source substrates 14 and the liquid crystal panel 10 is equal to that in the liquid crystal display module 100A.

The wall members 16a, 16b, 16c and 16d of the frame 16 of the liquid crystal display module 100B may have the same cross-sectional shape and dimensions as those of the wall members 16a, 16b, 16c and 16d of the frame 16 of the liquid crystal display module 100A, and therefore can be produced by using the same extrusion die. Therefore, while the back chassis 15 and the bezel 12 need to be newly designed and produced, the frame 16 can be produced by continuing to use the same extrusion die, so that the cost can be reduced as compared to a conventional liquid crystal display module having the configuration of the liquid crystal display module 900 according to Comparative Example.

Note that, regardless of the panel size, it is possible to commonly use any fastening hardware (e.g., an angle fixture 17 in FIG. 4C) with which to couple together the wall members 16a, 16b, 16c and 16d of the frame 16 and/or any holder (e.g., a holder 18 in FIG. 4C) to be disposed so as to close each of the interspaces between the wall members 16a, 16b, 16c and 16d.

Figure 1C:
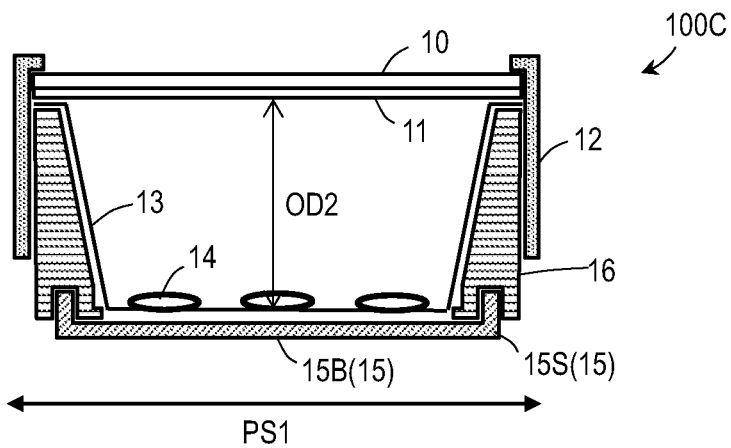
FIG. 1C is a schematic cross-sectional view of still another liquid crystal display module 100C according to an embodiment of the present invention.

The liquid crystal display module 100C shown in FIG. 1C has an optical distance OD2 which is larger than the optical distance OD1 of the liquid crystal display module 100A shown in FIG. 1A, and has the same panel size PS1 as that of the liquid crystal display module 100A. Although the wall members 16a, 16b, 16c and 16d of the frame 16 of the liquid crystal display module 100C need to be newly designed and produced in accordance with the optical distance OD2, the back chassis 15 and the bezel 12 can be commonly shared with the liquid crystal display module 100A. Therefore, die investments can be suppressed than in the case of conventional liquid crystal display modules, thereby enabling a cost reduction.

Figure 1D:
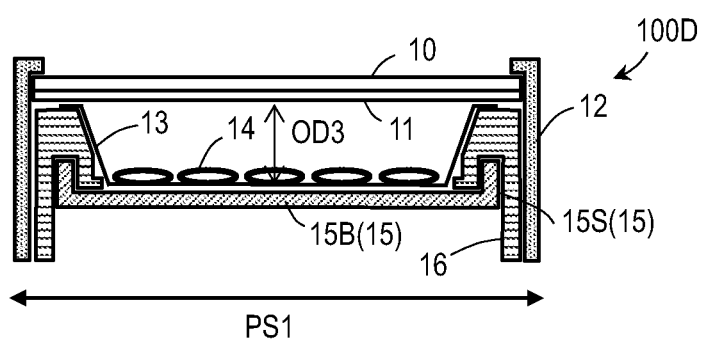
FIG. 1D is a schematic cross-sectional view of still another liquid crystal display module 100D according to an embodiment of the present invention.

The liquid crystal display module 100D shown in FIG. 1D has an optical distance OD3 which is smaller than the optical distance OD1 of the liquid crystal display module 100A shown in FIG. 1A, and has the same panel size PS1 as that of the liquid crystal display module 100A. Although the wall members 16a, 16b, 16c and 16d of the frame 16 of the liquid crystal display module 100D need to be newly designed and produced in accordance with the optical distance OD3, the back chassis 15 and the bezel 12 can be commonly shared with the liquid crystal display module 100A. Therefore, die investments can be suppressed than in the case of conventional liquid crystal display modules, thereby enabling a cost reduction.

When the optical distance OD is smaller, as is schematically indicated for the liquid crystal display modules 100A, 100C and 100D, the light sources need to be disposed at a higher density so that the intensity of light emitted from the light sources on the light source substrates 14 is sufficiently uniform. Therefore, the liquid crystal display module 100D having the smallest optical distance OD3 has the most light source substrates 14, while the liquid crystal display module 100C having the largest optical distance OD2 has the fewest light source substrates 14.

Thus, by just newly producing an extrusion die(s) with which to produce the frame 16, products of different optical distances OD (e.g., high-luminance products and less-expensive products featuring fewer LEDs) can be manufactured. Note that, when the number and/or arrangement of light source substrates 14 is changed, some of the dies for producing the back chassis 15 (e.g., a die for making a hole 15p for a rivet 42 that fixes each light source substrate 14 (see FIG. 5)) need to be changed; however, this will cause relatively little increase in costs.

Next, with reference to FIGS. 3A, 3B and 3C, FIGS. 4A, 4B, 4C and 4D, FIG. 5, FIGS. 7A, 7B, 7C and 7D, FIGS. 6A, 6B and 6C, FIGS. 8A, 8B and 8C, and FIGS. 9A, 9B and 9C, more specific example embodiments of liquid crystal display panels according to the present invention will be described.

Figure 3A:
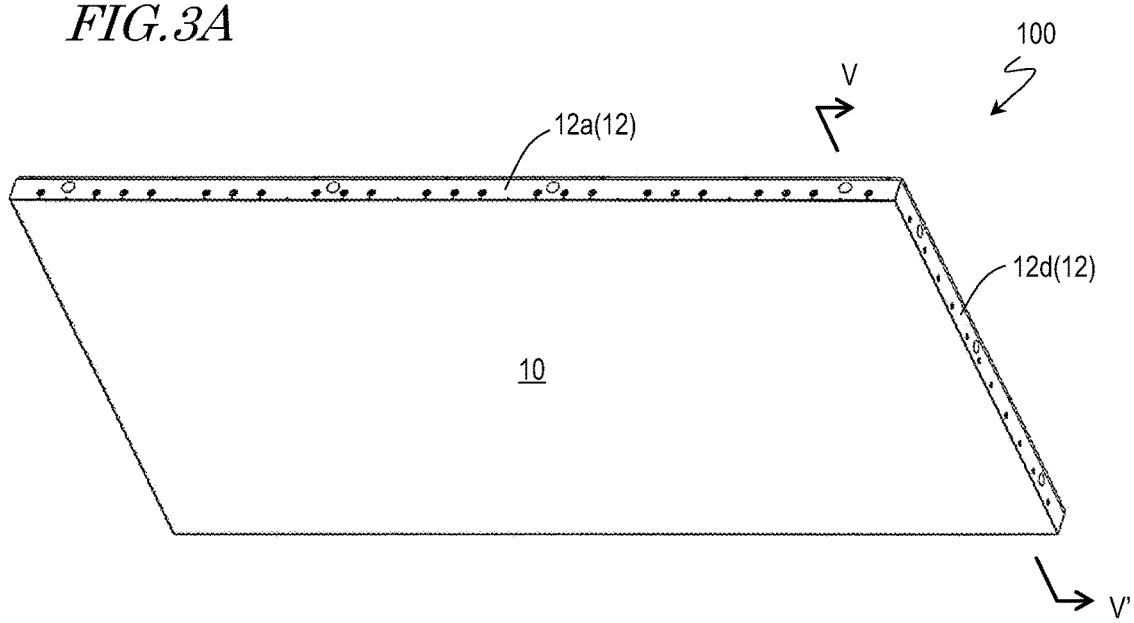
FIG. 3A is a perspective view schematically showing the appearance of a liquid crystal display module 100 according to an embodiment of the present invention.
Figure 3B:
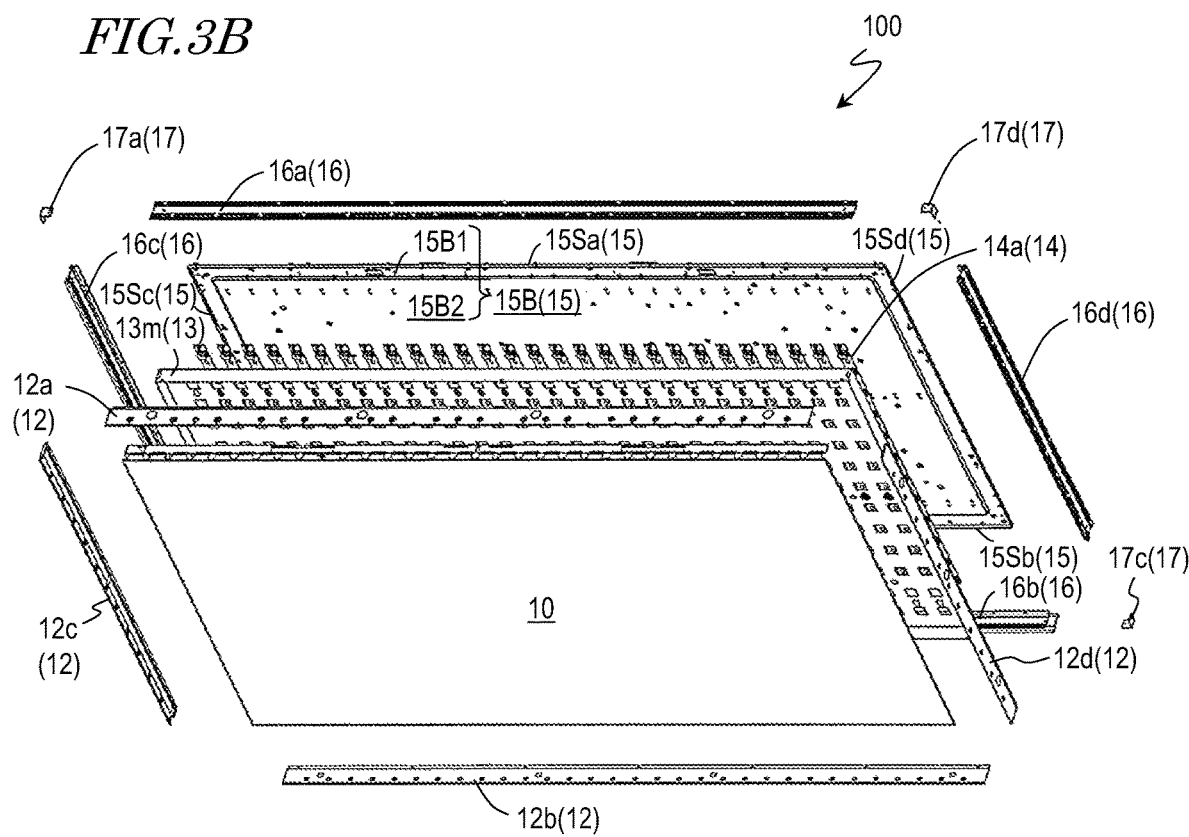
FIG. 3B is an exploded perspective view schematically showing the structure of the liquid crystal display module 100.

With reference to FIG. 3A and FIG. 3B, a configuration for a liquid crystal display module 100 according to an embodiment of the present invention will be described. FIG. 3A is a perspective view schematically showing the appearance of the liquid crystal display module 100, and FIG. 3B is an exploded perspective view schematically showing the structure of the liquid crystal display module 100. FIG. 3C is an exploded perspective view schematically showing the structure of a backlight unit 100BU of the liquid crystal display module 100. The liquid crystal display module 100 may be sized 60 inches, with vertical×horizontal×thickness dimensions of about 755 mm×about 1340 mm×about 45 mm, for example.

As shown in FIG. 3A and FIG. 3B, the liquid crystal display module 100 includes a liquid crystal panel 10, a bezel 12, a back chassis 15, and a frame 16. A reflective sheet 13 and LED substrates 14 are disposed on the back chassis 15. The perimeter of the liquid crystal panel 10 is surrounded by the bezel 12. The bezel 12 includes four independent plate-like members 12a, 12b, 12c and 12d, which are disposed so as to surround the four sides of the liquid crystal panel 10 and the four wall members 16a, 16b, 16c and 16d of the frame 16. The bezel 12 serves to protect the liquid crystal panel 10 as well as any semiconductor device (IC) and circuit board being mounted or connected to the liquid crystal panel 10, prevent dust intrusion from the outside, and prevent a light leak from the backlight. The bezel 12 is what defines the appearance of the liquid crystal display module 100 (as a completed product). However, as exemplified in e.g. FIG. 1C, the bezel 12 does not need to surround the entirety of the side surface.

On the rear face of the liquid crystal panel 10, the following is disposed: the reflective sheet 13; the LED substrates 14; and the back chassis 15 and the frame 16, on which these are placed. An optical film laminate (omitted from illustration here; see the optical film laminate 11 in FIG. 1A, for example) is attached onto the rear face of the liquid crystal panel 10 with an optical adhesive, for example.

The frame 16 includes four wall members 16a, 16b, 16c and 16d disposed correspondingly to the four sides of the liquid crystal panel 10. The wall members 16a, 16b, 16c and 16d are shaped so that their respective cross sections orthogonal to the longitudinal direction (i.e., a direction parallel to the corresponding side of the liquid crystal panel 10) are congruent, and are made out of the same extrusion. The frame 16 is disposed at a predetermined position on the back chassis 15, and is fixed by a screw(s), for example. In the case of a 60-inch super narrow-framed model, the wall members 16a, 16b, 16c and 16d of the frame 16 are each made of a piece of aluminum or an aluminum alloy with a thickness of not less than 2 mm and not more than 3 mm, for example. The structure of a liquid crystal display module according to an embodiment of the present invention is suitably used in super narrow-framed models; therefore, dimensions for a 60-inch super narrow-framed model will be illustrated below.

The back chassis 15 includes: a bottom 15B supporting the plurality of LED substrates 14; and four edge portions 15Sa, 15Sb, 15Sc and 15Sd (collectively referred to as the edge portions 15S) respectively extending in parallel to the four sides of the liquid crystal panel 10 and protruding from the bottom 15B toward the liquid crystal panel 10. The bottom 15B of the back chassis 15 includes: a base surface 15B1; and a support surface 15B2 on which the LED substrates 14 are mounted (see e.g. FIG. 5). The edge portions 15Sa, 15Sb, 15Sc and 15Sd may be omitted. The back chassis 15 is made of a piece of aluminum or an aluminum alloy with a thickness of 1.5 mm, for example.

Figure 3C:
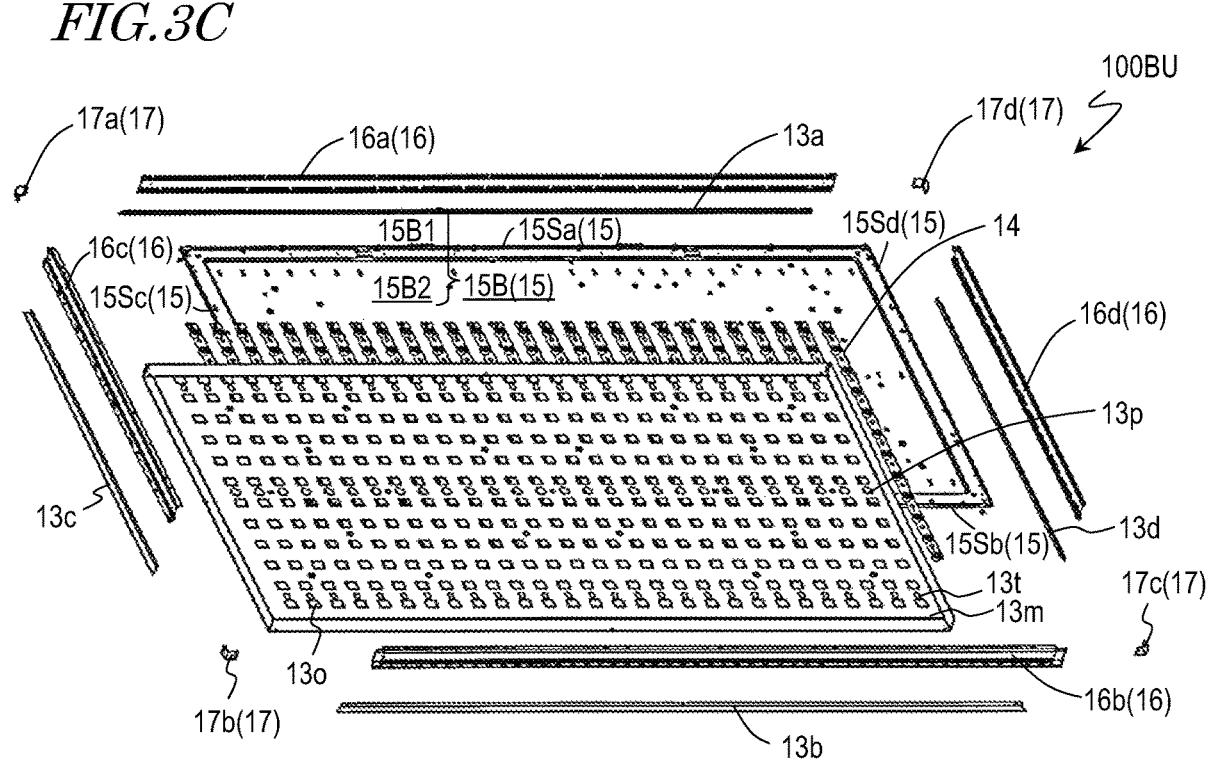
FIG. 3C is an exploded perspective view schematically showing the structure of a backlight unit 100BU of the liquid crystal display module 100.

On the back chassis 15, the LED substrates 14 and the reflective sheet 13 are disposed, for example, such that the frame 16 and back chassis 15 and the reflective sheet 13 and LED substrates 14 disposed on the back chassis 15 together constitute a backlight unit 100BU (see FIG. 3C). The liquid crystal panel 10 is disposed on the backlight unit 100BU, and the bezel 12 is attached to the frame 16 (see e.g. FIG. 5). The four plate-like members 12a, 12b, 12c and 12d of the bezel 12 are fixed respectively to the four wall members 16a, 16b, 16c and 16d of the frame 16. The plate-like members 12a, 12b, 12c and 12d of the bezel 12 are made of pieces of stainless steel (SUS) with a thickness of 0.3 mm, for example. When stainless steel is used, the plate-like members 12a, 12b, 12c and 12d of the bezel 12 can be reduced in thickness as compared to the case of using an aluminum-based material, whereby a narrow-frame construction can be attained.

The LED substrates 14 are provided, in a plurality, as the light sources including bar-shaped LED substrates 14, on which a plurality of LEDs are arranged along the vertical direction (i.e., so as to be parallel to the shorter sides of the liquid crystal panel 10), for example. It will be appreciated that the light source substrates 14 are not limited thereto. For example, a plurality of LEDs may be arranged along the horizontal direction, or LED substrates each having a plurality of LEDs arranged thereon along the vertical and horizontal directions may be placed in a tiled-up arrangement.

As shown in FIG. 3C, the reflective sheet 13 includes: a first reflective sheet 13m, having four side faces opposed to the four independent wall members 16a, 16b, 16c and 16d of the frame 16 and a bottom face having a plurality of apertures through which the plurality of light sources are respectively exposed; and four independent second reflective sheets 13a, 13b, 13c and 13d disposed respectively between the four wall members 16a, 16b, 16c and 16d of the frame 16 and the liquid crystal panel 10. In other words, the reflective sheet 13 is composed of five portions. Since the second reflective sheets 13a, 13b, 13c and 13d are disposed between the respective wall members 16a, 16b, 16c and 16d of the frame 16 and the liquid crystal panel 10, the liquid crystal panel 10 is not in direct contact with the wall members 16a, 16b, 16c and 16d of the frame 16. If the wall members 16a, 16b, 16c and 16d of the frame 16 being made of a metal (e.g., aluminum) were in direct contact with the liquid crystal panel 10, microcracks might occur in a glass substrate of the liquid crystal panel 10. The second reflective sheets 13a, 13b, 13c and 13d help to suppress or prevent occurrence of microcracks. Moreover, the second reflective sheets 13a, 13b, 13c and 13d are attached onto the wall members 16a, 16b, 16c and 16d of the frame 16 so as to cover their respective upper ends, thus contributing to an improved ease of assembly work and prevention of loosening of any portions supporting the liquid crystal panel 10. The first reflective sheet 13m and the second reflective sheets 13a, 13b, 13c and 13d may be made of an ultra-fine foamed film (e.g., an ultra-fine foamed PET film) with a thickness of 0.225 mm, for example.

Figure 4A:
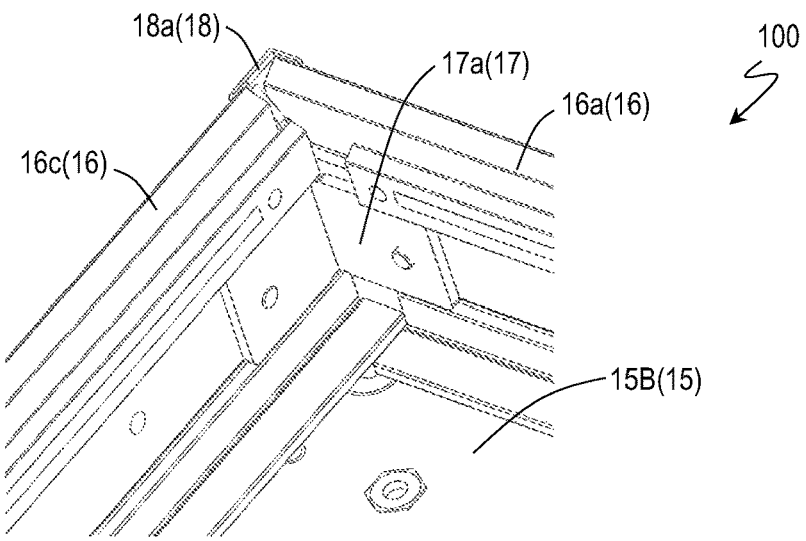
FIG. 4A is a schematic perspective view of a corner of the liquid crystal display module 100.
Figure 4B:
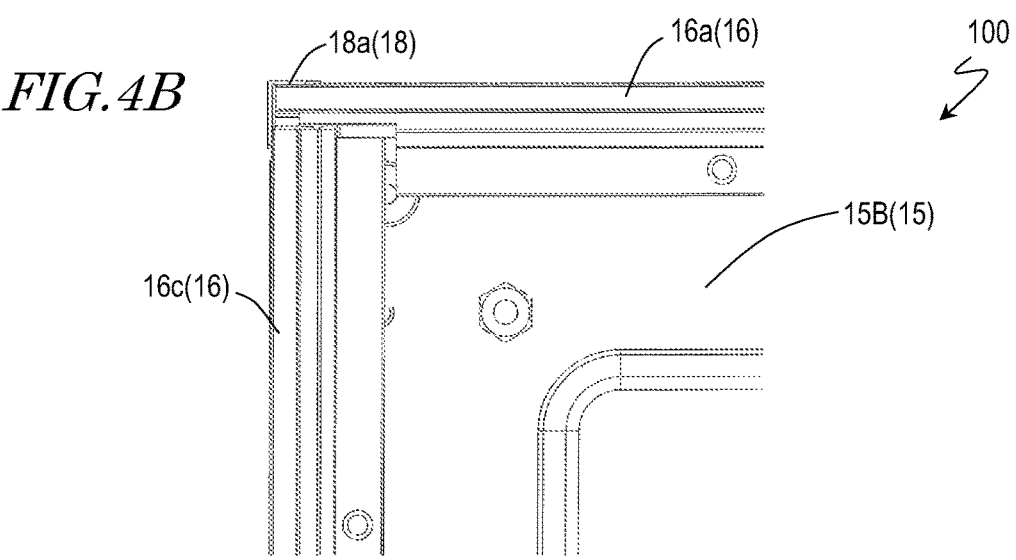
FIG. 4B is a schematic upper plan view of the corner of the liquid crystal display module 100.
Figure 4C:
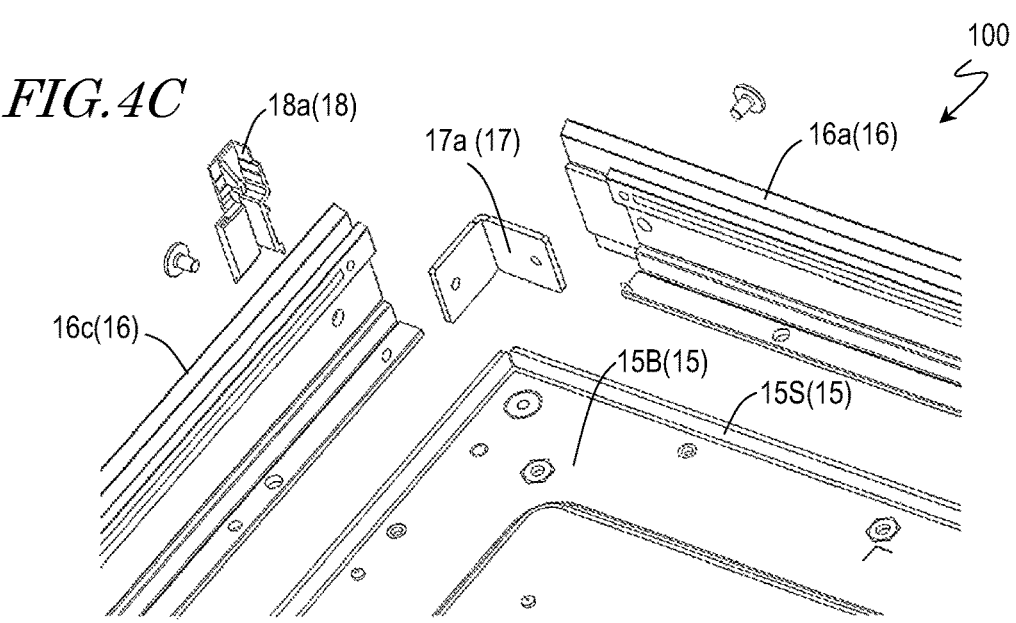
FIG. 4C is an exploded perspective view schematically showing the structure of the corner of the liquid crystal display module 100.

Next, with reference to FIG. 4A, FIG. 4B and FIG. 4C, the structure of corners of the liquid crystal display module 100 will be described. FIG. 4A is a schematic perspective view of a corner of the liquid crystal display module 100. FIG. 4B is a schematic upper plan view of the corner of the liquid crystal display module 100. FIG. 4C is an exploded perspective view schematically showing the structure of the corner of the liquid crystal display module 100. The four corners of the liquid crystal display module 100 may be similarly structured.

In order to increase the torsional stiffness of the backlight unit 100BU, an angle fixture 17a is disposed astride the wall member 16a and the wall member 16c of the frame 16, and is fixed with screws. Moreover, the wall members 16a and 16c have a recessed cross-sectional shape so that a groove is created therein for improved strength, for example, such that the angle fixture 17a is disposed along the grooves in the wall members 16a and 16c. The angle fixture 17a may be made of a galvanized steel plate (SECC material), for example.

Furthermore, a holder 18a is disposed so as to close the interspace between the two wall members 16a and 16c constituting the corner. The holder 18a can prevent dust intrusion and/or a light leak from the backlight. The holder 18a may be made of PC (polycarbonate), for example.

Figure 4D:
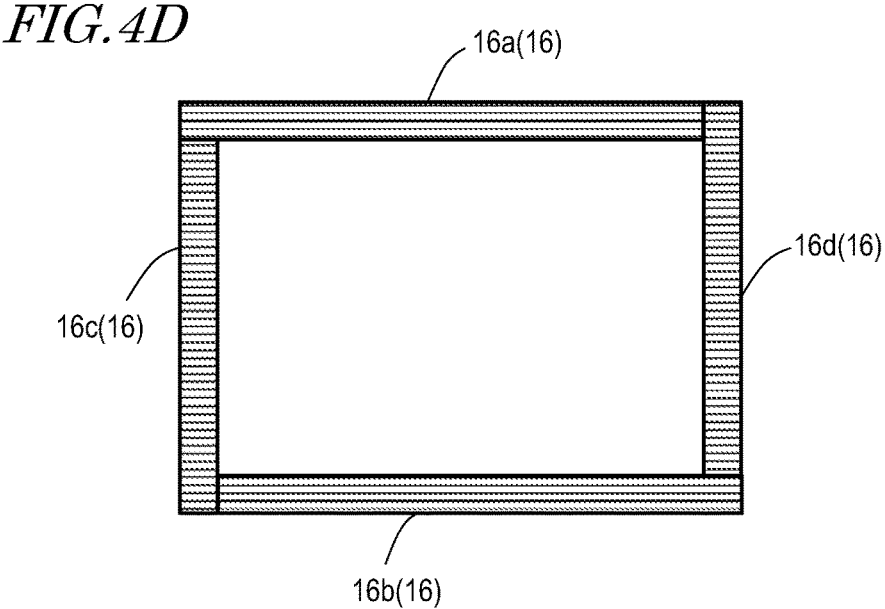
FIG. 4D is a schematic plan view of a frame 16 (modified example).

As illustrated herein, in each of the four corners created by two adjacent wall members, an end portion of one of the wall members is disposed inside the other wall member. Herein, an interspace (margin) is provided between wall members in order to account for variation in length. Therefore, the wall members are not directly coupled, but may be coupled via fastening hardware such as the angle fixture 17, for example. Although an example is illustrated where the two shorter wall members 16c and 16d disposed along the vertical direction are interposed between the two longer wall members 16a and 16b disposed along the horizontal direction, these may of course be reversed. Furthermore, as schematically shown in FIG. 4D, one end portion of each wall member (e.g. 16a) may be disposed inside an end portion of an adjacent wall member (e.g. 16d), while the other end portion may have an end portion of an adjacent wall member (e.g. 16c) disposed inside it.

Figure 5:
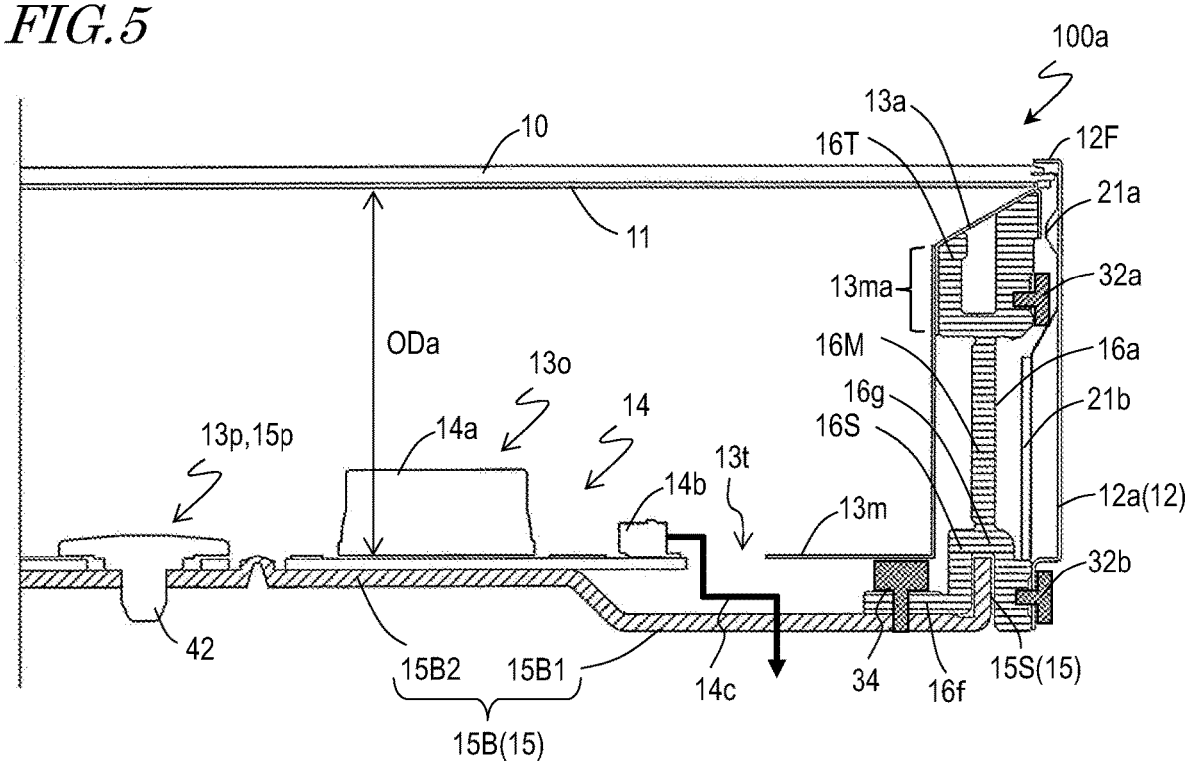

FIG. 5 is a schematic partial cross-sectional view of a liquid crystal display module 100a, corresponding to the neighborhood of the plate-like member 12a of the bezel 12 within a cross-sectional view, taken along line V-V', of the liquid crystal display module 100 shown in FIG. 3A. The liquid crystal display module 100a is basically similar in structure to the liquid crystal display module 100, such that a COF (Chip On Film) 21a having a plurality of source driver ICs thereon and a plurality of circuit boards 21b are mounted thereon, along the plate-like member 12a. The cross section shown in FIG. 5 is a cross section of a portion where the driver ICs do not exist (i.e., a portion where only the film 21a and the substrate 21b are present).

The back chassis 15 includes a bottom 15B supporting the LED substrates 14 and an edge portion 15S protruding from the bottom 15B toward the liquid crystal panel 10. The bottom 15B has a base surface 15B1 and a support surface 15B2 on which the LED substrates 14 are mounted. The bottom 15B as such is formed through a drawing process for improved strength. The edge portions 15Sa, 15Sb, 15Sc and 15Sd may be formed through a bending process so as to contribute to improved strength and dust prevention, but may be omitted.

The wall member 16a of the frame 16 includes a top portion 16T, a middle portion 16M, and a support portion 16S. The support portion 16S has a groove 16g, such that the edge portion 15S of the back chassis 15 fits in the groove 16g. The support portion 16S includes a flat portion 16f which is in contact with and extends in parallel to the bottom 15B of the back chassis 15, such that the support portion 16S is fixed to the bottom 15B of the back chassis 15 at the flat portion 16f, with screws 34. In the flat portion 16f, holes (not shown) for accepting positioning bumps (not shown) are made in the back chassis 15, so that the frame 16 is placed in position as these are fitted with one another. Two or more such fitting structures are provided per side. The top portion 16T of the wall member 16a has a slanted upper face.

Each LED substrate 14 has a plurality of LEDs 14a and a connector 14b mounted thereon, and is fixed by the rivet 42 being inserted in the hole 15p made in the support surface 15B2 of the bottom 15B of the back chassis 15. The connector 14b is connected to a power source and wiring 14c for inputting a signal. The wiring 14c, in turn, extends through the hole 13t in the reflective sheet 13 to the back of the reflective sheet 13, and is taken outside through a hole in the back chassis 15, so as to be connected to the power source and a substrate for supplying a signal (none of these being shown) disposed on the rear face of the back chassis 15.

The LEDs 14a exemplified herein as light sources each include an LED chip and a lens provided on the LED chip, with the outer shape of this lens being represented in the figures. As will be appreciated, without being limited thereto, an LED without a lens may be used as each light source. The shape of the lens of the LED 14a is not limited to this example, either.

The first reflective sheet 13m includes: a side face opposed to the wall member 16a of the frame 16; and a bottom face having a plurality of apertures 13o through which the plurality of light source LEDs are respectively exposed. The first reflective sheet 13m also has an aperture 13p for the rivet 42, and the aperture 13t for the connector 14b and the wiring 14c. The second reflective sheet 13a is disposed so as to cover the top portion 16T of the wall member 16a, and constitutes a slanted surface along the slanted upper face of the top portion 16T. The first reflective sheet 13m and the second reflective sheet 13a are overlaid upon one another on the wall member 16a (region 13ma). For example, on the vertical side surface of the top portion 16T of the wall member 16a, the first reflective sheet 13m may be overlaid on the second reflective sheet 13a. The second reflective sheet 13a and the top portion 16T of the wall member 16a may be attached together with an adhesive, and the second reflective sheet 13a and the first reflective sheet 13m may be attached together with an adhesive, for example.

If the wall member 16a of the frame 16 (particularly being made of a metal) is in direct contact with the liquid crystal panel 10, microcracks may occur in the glass substrate of the liquid crystal panel 10. The second reflective sheet 13a helps to suppress or prevent occurrence of microcracks.

Moreover, the second reflective sheet 13a is disposed near the liquid crystal panel 10 and in a region from outside of the displaying region of the liquid crystal panel 10 and into the displaying region. As a result, even when the periphery of the displaying region is obliquely observed, no pixels will be missing across the way to the end portion of the displaying region of the liquid crystal display module 100a, so that the display surface of the liquid crystal panel will attain a certain level of luminance.

On the rear face of the liquid crystal panel 10, the optical film laminate 11 is attached with an optical adhesive, for example. The optical film laminate 11 may include a brightness enhancement film (BEF), a light-diffusing film, a prism sheet and/or a microlens sheet, for example. The liquid crystal panel 10 and the optical film laminate 11 are supported by the top portion 16T of the wall member 16a of the frame 16, via the second reflective sheet 13a.

Figure 11:
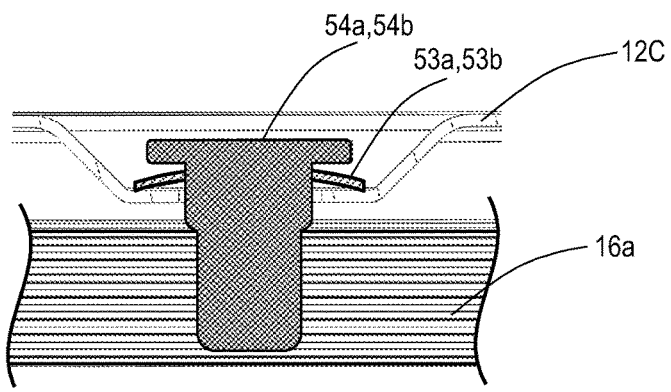
FIG. 11 is a schematic cross-sectional view of the neighborhood of a stepped screw 54a, 54b in the liquid crystal display module 200b.

The plate-like member 12a of the bezel 12, which includes a frame-like portion 12F, is disposed so as to retain the liquid crystal panel 10 and the optical film laminate 11 and to cover the COF 21a and the circuit board 21b, and is fixed to the wall member 16a of the frame 16 with screws 32a and 32b. Although omitted from illustration, as shown in FIG. 11, the plate-like member 12a is squeezed in the portion corresponding to the screw 32a.

What has been described herein is the cross-sectional structure of one of the four sides of the liquid crystal display module 100a; however, the other three sides also have a basically similar structure. Therefore, any detailed description thereof is omitted.

Note that the shape of each plate-like member of the bezel 12 is not limited to what is exemplified herein; for example, as is described in International Publication No. 2017/017819, a plate-like member may be locally deformed so as to be in contact with the side surface of the liquid crystal panel 10. For example, the plate-like member 12a may be locally pressed toward the liquid crystal panel 10 ("squeezed"), thus forming a protrusion that is in contact with the side surface of the liquid crystal panel 10 to retain the liquid crystal panel 10. For reference, the entire disclosure of International Publication No. 2017/017819 is herein incorporated by reference.

Figure 6A:
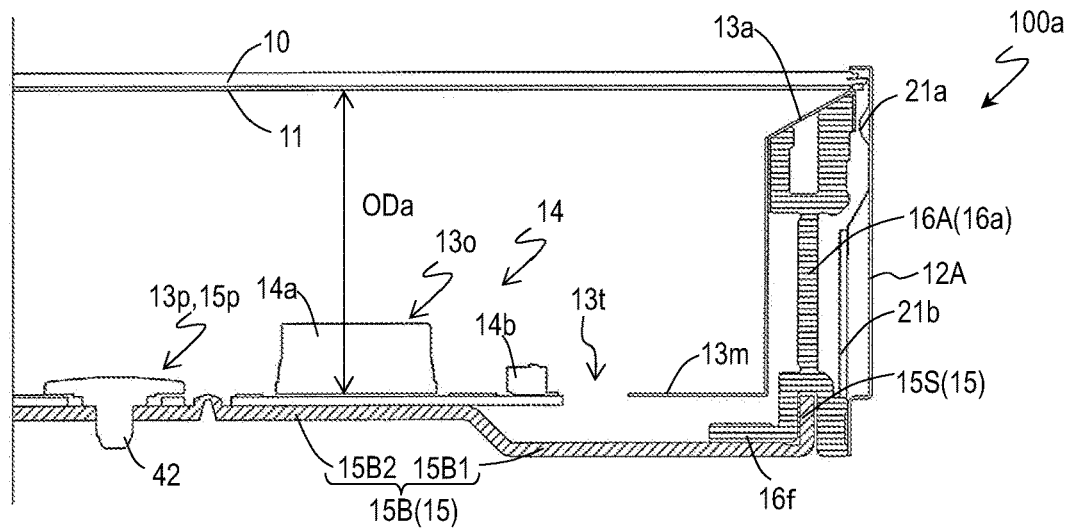
Figure 6B:
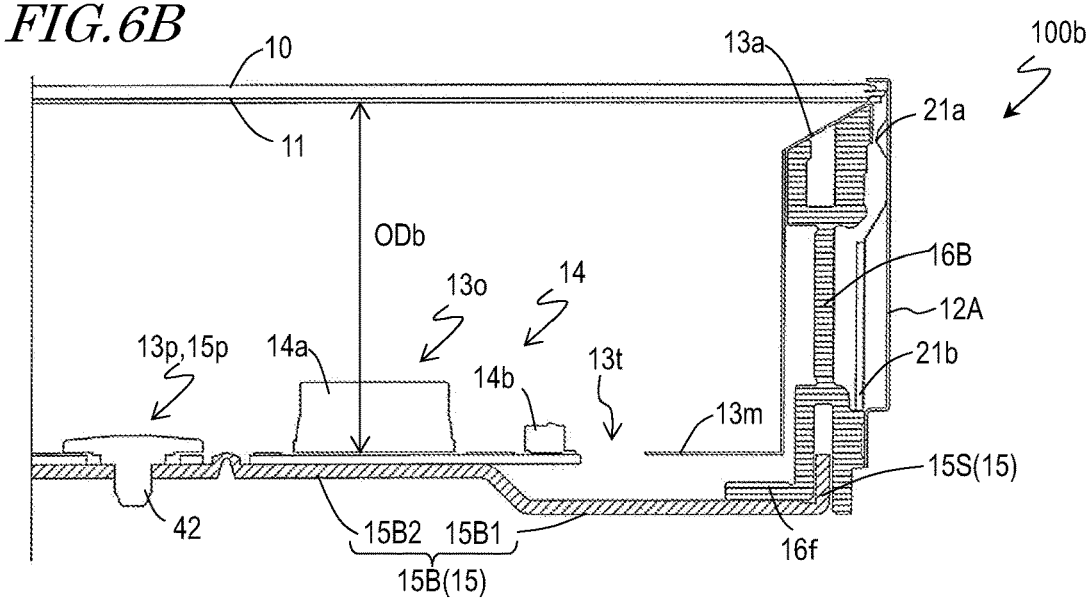
FIG. 6B is a schematic partial cross-sectional view of a liquid crystal display module 100b.
Figure 6C:
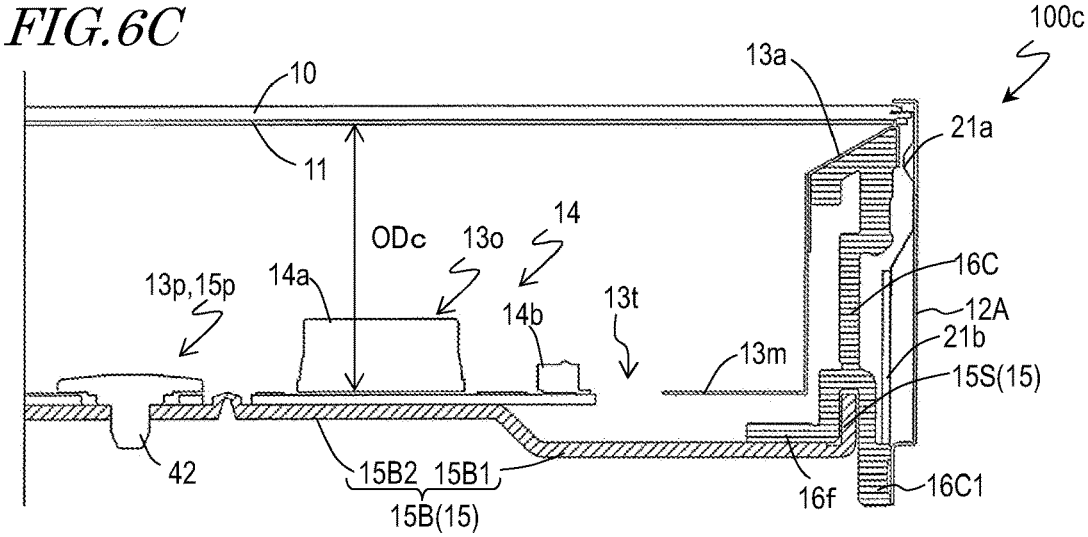
FIG. 6C is a schematic partial cross-sectional view of a liquid crystal display module 100c.

Next, with reference to FIG. 6A, FIG. 6B and FIG. 6C, structures of liquid crystal display panels of different optical distances will be described. FIG. 6A, FIG. 6B and FIG. 6C are schematic partial cross-sectional views of liquid crystal display modules 100a, 100b and 100c, respectively, corresponding to FIG. 5.

The liquid crystal display module 100a shown in FIG. 6A is identical to the liquid crystal display module 100a shown in FIG. 5. However, the screws 32a, 32b and 34 and the wiring 14c are omitted from illustration. The reference numeral 16A in FIG. 6A corresponds to the wall member 16a of the frame in FIG. 5. The liquid crystal display module 100a has an optical distance ODa. In FIGS. 6A, 6B and 6C, the same reference numerals 16A, 16b and 16C are used for both the frame and the wall members of the frame.

The liquid crystal display module 100b shown in FIG. 6B has an optical distance ODb, the optical distance ODb being larger than the optical distance ODa of the liquid crystal display module 100a. The wall member 16B of the frame of the liquid crystal display module 100b is higher than the wall member 16A of the frame of the liquid crystal display module 100a (i.e., the liquid crystal display module 100b has a greater length along the thickness direction). For example, as illustrated herein, the height of the support portion of the frame 16B is greater than the height of the support portion of the wall member 16A of the frame. Because of this different height of the wall member 16B of the frame, the liquid crystal display module 100b has a larger optical distance ODb than that of the liquid crystal display module 100a. Component elements of the liquid crystal display module 100b other than the wall member 16B of the frame may be identical to those of the liquid crystal display module 100a.

The liquid crystal display module 100c shown in FIG. 6C has an optical distance ODc, the optical distance ODc being smaller than the optical distance ODa of the liquid crystal display module 100a. The wall member 16C of the frame of the liquid crystal display module 100c is lower than the wall member 16A of the frame of the liquid crystal display module 100a (i.e., the length of the liquid crystal display module 100c along the thickness direction is smaller). For example, as illustrated herein, the height of the middle portion of the wall member 16C of the frame is smaller than the height of the middle portion of the wall member 16A of the frame. Because of this different height of the wall member 16C of the frame, the liquid crystal display module 100c has a smaller optical distance ODc than that of the liquid crystal display module 100a. Component elements of the liquid crystal display module 100c other than the wall member 16C of the frame may be identical to those of the liquid crystal display module 100a. As is illustrated herein, by increasing the height of the support portion correspondingly to the decreased height of the middle portion of the wall member 16C of the frame, it becomes possible to commonly share the bezel 12A.

As described above, the liquid crystal display modules 100a, 100b and 100c having respectively different optical distances only differ with respect to their frames 16A, 16B and 16C, while the other parts can be shared in common. It will be appreciated that, when the number and/or arrangement of LED substrates 14 is to be changed according to the changing optical distance, each corresponding back chassis 15 can be provided by only changing some of the steps (e.g., only changing the holing step).

Next, with reference to FIGS. 7A, 7B, 7C and 7D, the structure of a corner of another liquid crystal display module 110 according to an embodiment of the present invention will be described. Except for the corner structure, the liquid crystal display module 110 may be identical in structure to the liquid crystal display module 100.

Figure 7A:
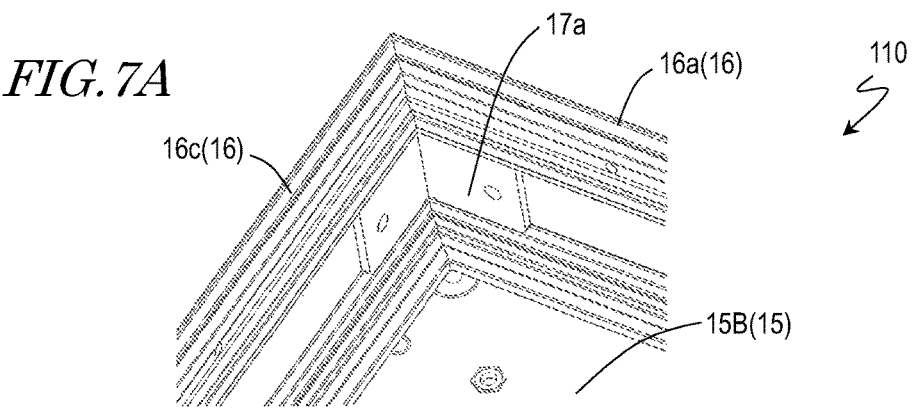
FIG. 7A is a schematic perspective view of a corner of the frame 16 of another liquid crystal display module 110 according to an embodiment of the present invention.
Figure 7B:
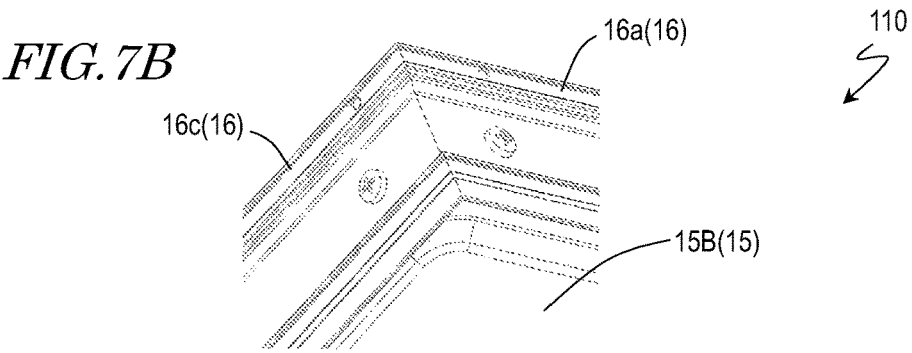
FIG. 7B is a schematic perspective view of the corner of the frame 16.
Figure 7C:
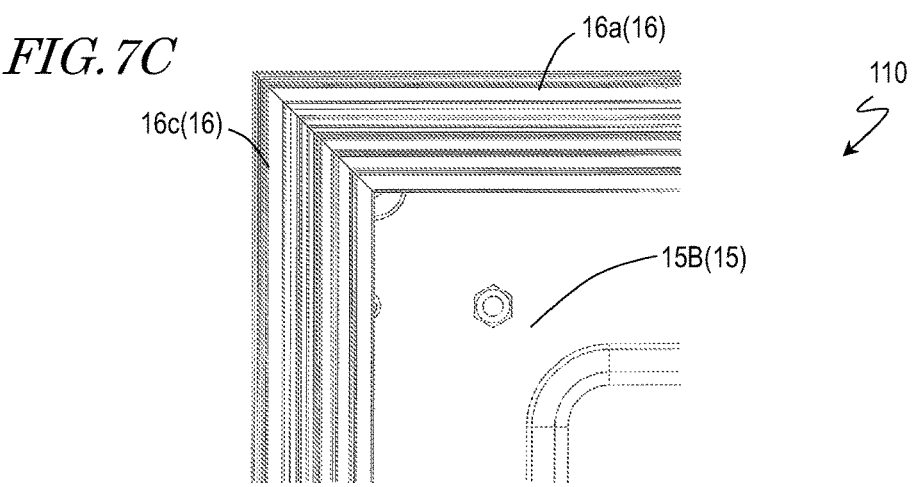
FIG. 7C is a schematic plan view of the corner of the frame 16.
Figure 7D:
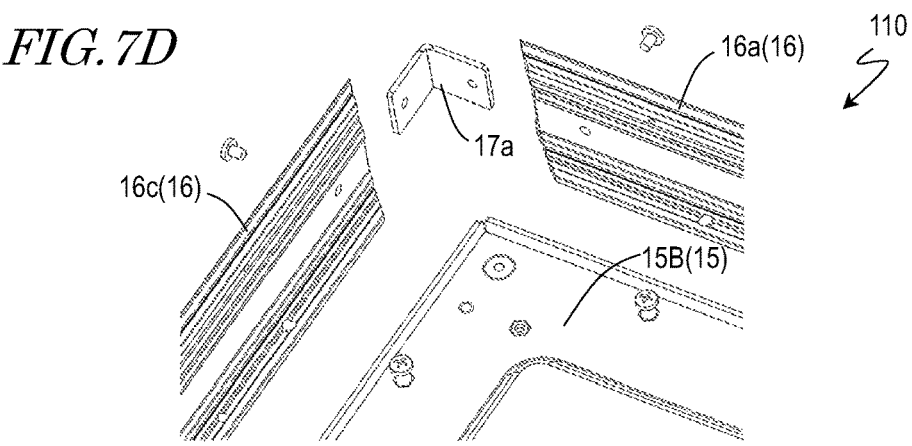
FIG. 7D is a schematic exploded perspective view of the corner of the frame 16.

FIG. 7A and FIG. 7B are schematic perspective views of a corner of a frame 16 of the liquid crystal display module 110. FIG. 7C is a schematic plan view of the corner of the frame 16 of the liquid crystal display module 110, and FIG. 7D is a schematic exploded perspective view of the corner of the frame 16 of the liquid crystal display module 110. Four corners of the liquid crystal display module 110 basically have the same structure.

Similarly to each corner of the liquid crystal display module 100 shown in FIGS. 4A, 4B and 4C, each corner of the liquid crystal display module 110 is configured so that, in order to increase the torsional stiffness of the backlight unit 100BU, an angle fixture 17a is disposed astride the wall member 16a and the wall member 16c of the frame 16, and is fixed with screws.

An end portion of each of the four independent wall members 16a, 16b, 16c and 16d of the frame 16 of the liquid crystal display module 110 has a 45° beveled face, and is fixed so that the beveled faces of two adjacent wall members are opposed to each other. Since the wall members 16a, 16b, 16c and 16d have congruent cross-sectional shapes, when each corner is obliquely cut at a 45° angle and two adjacent wall members are opposed to each other, they can be coupled without allowing an interspace to be created between them. Therefore, without having to provide a holder 18 as in the liquid crystal display module 100 shown in FIGS. 4A, 4B and 4C, light leaks and dust intrusion can be prevented. Note that the coupling between the beveled faces of wall members can be achieved with an adhesive, for example; alternatively, they may be simply positioned on the back chassis 15 and fixed with screws.

Figure 8A:
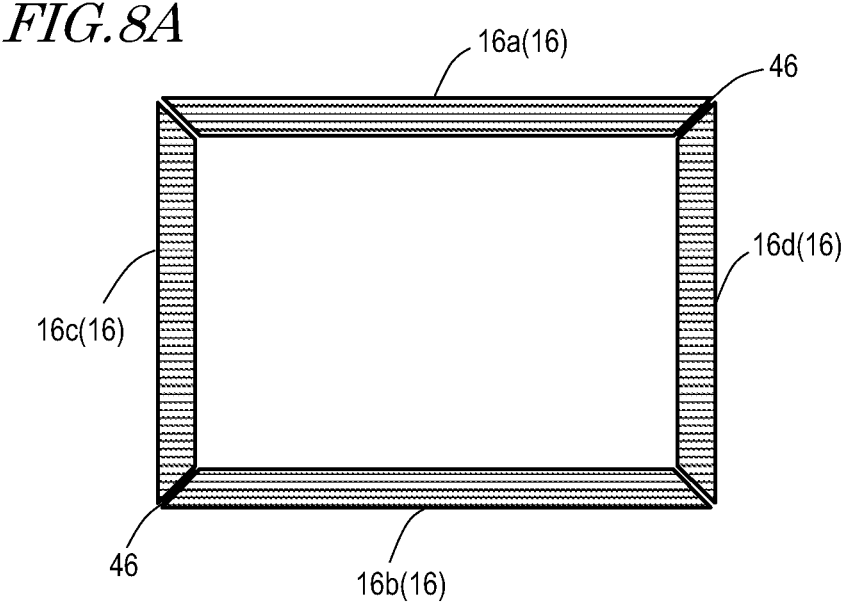
FIG. 8A is a schematic plan view of the frame 16 (modified example).
Figure 8B:
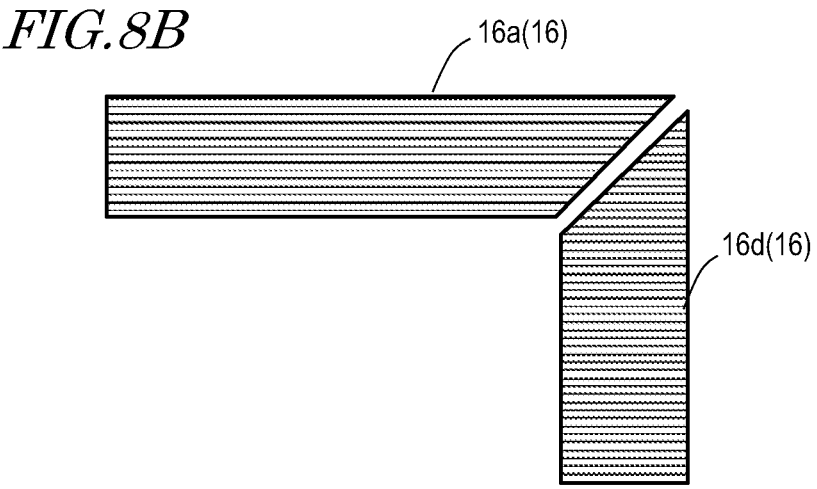
FIG. 8B is a schematic plan view of a corner of the frame 16 (modified example).
Figure 8C:
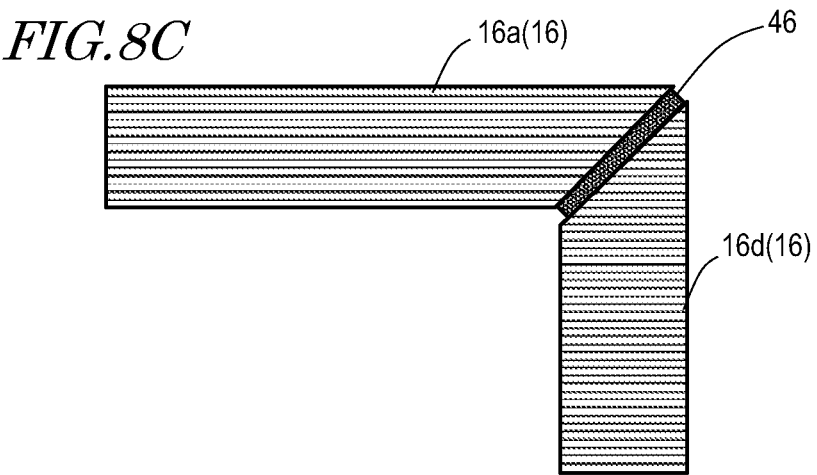
FIG. 8C is a schematic plan view of the corner of the frame 16 (modified example).

With reference to FIGS. 8A, 8B and 8C, a modified example will be described. In a frame 16 as shown in FIG. 8A, interspaces are provided between the wall members 16a and 16d and between the wall members 16b and 16c, and adjacent wall members are fixed with a packing member 46 disposed in each such interspace.

Even if the wall members 16a, 16b, 16c and 16d are cut out from the same extrusion, variations in length may still occur. This may cause an interspace to be created between the wall members 16a and 16d as shown in FIG. 8B, for example. Or conversely, if the wall member 16a is too long, for example, the wall member 16a and the wall member 16d may be coupled together without making a right angle, or may not be coupled at all. One possible design for avoiding this may be to create interspaces (e.g. not less than 1 mm and not more than 2 mm) between pairs of wall members creating at least two diagonal corners (e.g., between the wall members 16a and 16d and between the wall members 16b and 16c), and each adjacent pair of wall members may be fixed with a packing member 46 which is thick enough to fill the interspace. Although requiring the packing members 46, such a configuration can avoid the aforementioned problems. The packing members 46 are preferably able to make enough deformation to absorb variation in dimensions among the interspaces, and are preferably are made of a rubber (including elastomers) or a plastic. The thickness of the packing members is appropriately set so as to be larger than the aforementioned interspace (e.g. not less than 1 mm and not more than 2 mm) and in accordance with the hardness (elastic modulus) of the packing members 46; for example, it may be designed 0.1 mm to 1 mm (or more) greater than the interspace.

When the back chassis is made of aluminum or an aluminum alloy (which may be collectively referred to as "aluminum-based materials") to reduce the weight of the liquid crystal display module, because of the coefficient of thermal expansion of the aluminum-based material being greater than that of an iron-based material (e.g., stainless steel), a defect may occur due to a difference in coefficient of thermal expansion with the glass substrate of the liquid crystal panel. The defect due to a difference in the coefficient of thermal expansion will become more significant as the panel size increases. Two types of defects are possible, as follows.

When the temperature of the liquid crystal display module is higher than room temperature (approximately 25° C.), since an amount of thermal expansion of the liquid crystal panel will be smaller than an amount of thermal expansion of the backlight unit including the back chassis 15 made of an aluminum-based material, this difference in the amount of thermal expansion will cause an interspace between the bezel and the liquid crystal panel (e.g., as indicated at G in FIG. 9A), thus resulting in a light leak.

On the other hand, when the temperature of the liquid crystal display module is lower than room temperature, since an amount of thermal contraction of the liquid crystal panel will be smaller than an amount of thermal contraction of the backlight unit, a compressive stress (e.g., as indicated by arrow AR1 in FIG. 9B) will act from the bezel on the liquid crystal panel, thereby causing a change in the alignment of liquid crystal molecules and hence a displaying problem (e.g., white dots). As is described in International Publication No. 2017/017819, supra, this defect becomes more outstanding when adopting a structure in which a plate-like member of the bezel is utilized to retain the liquid crystal panel.

In the bezel of a liquid crystal display module according to an embodiment of the present invention illustrated below, the four independent plate-like members are configured so as to suppress defects ascribable to the aforementioned difference in the coefficient of thermal expansion. The bezel configuration in the below-described embodiment is applicable to any of the bezels according to the aforementioned embodiments.

Figure 9A:
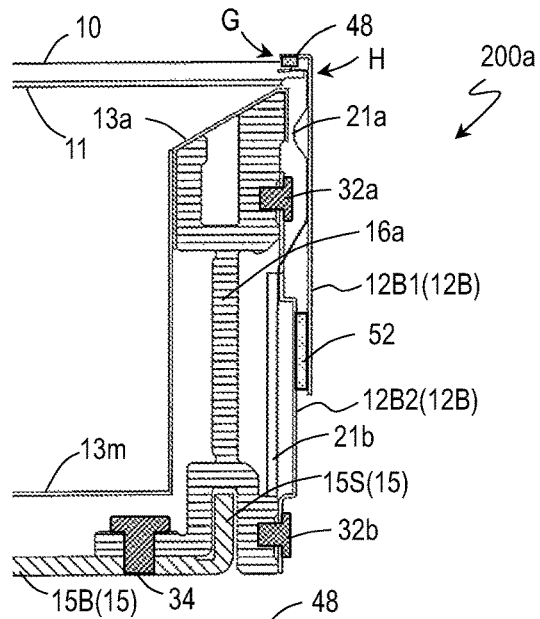
FIG. 9A is a schematic partial cross-sectional view of a liquid crystal display module 200a according to an embodiment of the present invention (room temperature).
Figure 9B:
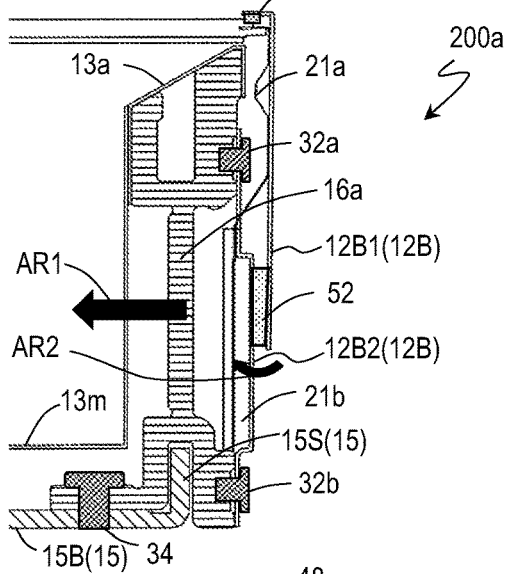
FIG. 9B is a schematic partial cross-sectional view of the liquid crystal display module 200a (low temperature).
Figure 9C:
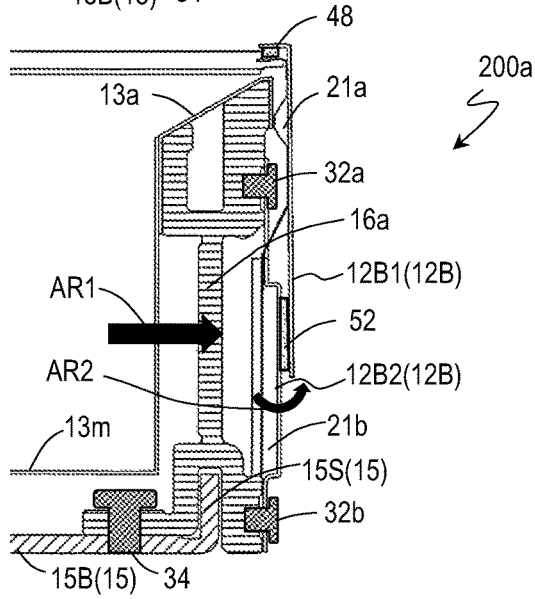
FIG. 9C is a schematic partial cross-sectional view of the liquid crystal display module 200a (high temperature).

With reference to FIGS. 9A, 9B and 9C, the structure of a liquid crystal display module 200a according to an embodiment of the present invention will be described. FIGS. 9A, 9B and 9C correspond to the neighborhood of a plate-like member 12B of a bezel 12B (note that the same reference numeral 12B is used for both the bezel and the plate-like member of the bezel). FIG. 9A shows a state of the liquid crystal display module 200a at room temperature; FIG. 9B shows its state at a low temperature which is lower than room temperature; and FIG. 9C shows its state at a high temperature which is higher than room temperature.

The four independent plate-like members 12B of the liquid crystal display module 200a are each configured so that, when a lower portion that is directly in contact with or indirectly fixed to the frame 16 is displaced, the amount of displacement of an upper portion that is directly in contact with or indirectly fixed to the liquid crystal panel 10 is smaller than the amount of displacement of the lower portion. For example, the four independent plate-like members 12B of the liquid crystal display module 200a are each configured so that an upper portion that is directly in contact with or indirectly fixed to the liquid crystal panel 10 can easily undergo elastic deformation with respect to the lower portion that is directly in contact with or indirectly fixed to the frame 16. Specifically, each of the four independent plate-like members 12B of the bezel of the liquid crystal display module 200a includes two independent plate members 12B1 and 12B2, such that the upper side-plate member 12B1 and the lower side-plate member 12B2 are adhesively bonded to each other via an elastic member 52. As the elastic member 52 undergoes elastic deformation, the upper side-plate member 12B1 can easily undergo elastic deformation with respect to the lower side-plate member 12B2.

The elastic member 52 is sized so that it has a thickness of not less than about 1 mm and not more than about 4 mm and a width (i.e., length along the up-down direction in FIG. 9A) of not less than about 5 mm and not more than about 15 mm, for example. The upper side-plate member 12B1 is adhesively bonded to the liquid crystal panel 10 via an adhesive layer (meant to be inclusive of a "pressure-sensitive adhesive layer") 48. The adhesive layer 48 is formed by using a double sided tape, for example. The lower side-plate member 12B2 is fixed to the wall member 16a of the frame with screws 32a and 32b.

In the case of a 60-inch model, given a room temperature of 25° C., a high temperature of 70° C., and a low temperature of −35° C., the difference in the amount of thermal expansion at the high temperature is about 0.5 mm vertically and 0.9 mm horizontally, and the difference in the amount of thermal contraction at the low temperature is about 0.65 mm vertically and about 1.2 mm horizontally. For example, when the elastic member 52 made of a low-hardness silicone rubber or polyurethane foam has the aforementioned dimensions, the aforementioned change in dimensions due to temperature changes can be absorbed.

The liquid crystal display module 200a shown in FIG. 9A is in a room-temperature environment, where the elastic member 52 is in a natural state without receiving any stress. Now, if a structure as described in International Publication No. 2017/017819 is adopted in which a plate-like member 12B of the bezel is utilized to retain the liquid crystal panel 10, then the plate-like member 12B (upper side-plate member 12B1) will be in contact with and pressing against the liquid crystal panel 10 at point H.

The liquid crystal display module 200a shown in FIG. 9B is in an environment at a lower temperature than room temperature, where contraction of the back chassis 15 has caused the wall member 16a of the frame 16 to be displaced in the direction of arrow AR1 relative to the liquid crystal panel 10. As a result of this, the elastic member 52 is stretched, and a stress in the direction of arrow AR1 acts from the elastic member 52 toward the upper side-plate member 12B1 of the bezel 12B. Consequently, the upper side-plate member 12B1 tries to rotate in the direction of arrow AR2 (with point H as the fulcrum), thus acting to weaken the force of pressing the liquid crystal panel 10 at point H. As a result, displaying problems (e.g., white dots) caused by any compressive stress due to the difference in the coefficient of thermal expansion are suppressed.

The liquid crystal display module 200a shown in FIG. 9C is in an environment at a higher temperature than room temperature, where expansion of the back chassis 15 has caused the wall member 16a of the frame 16 to be displaced in the direction of arrow AR1 relative to the liquid crystal panel 10. As a result of this, the elastic member 52 is compressed, and a stress in the direction of arrow AR1 acts from the elastic member 52 toward the upper side-plate member 12B1 of the bezel 12B. Consequently, the upper side-plate member 12B1 tries to rotate in the direction of arrow AR2 (with point H as the fulcrum), whereby a force in the direction of pressing the liquid crystal panel 10 acts at point H, thus restraining an interspace from emerging between the upper side-plate member 12B1 of the bezel 12B and the liquid crystal panel 10 (as indicated at G in FIG. 9A). As a result, a light leak ascribable to the difference in the coefficient of thermal expansion is suppressed.

Figure 10A:
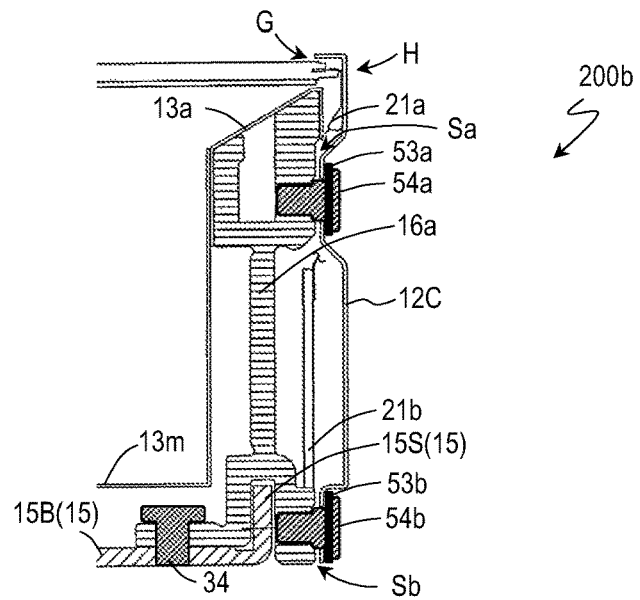
FIG. 10A is a schematic partial cross-sectional view of a liquid crystal display module 200b according to an embodiment of the present invention (room temperature).
Figure 10B:
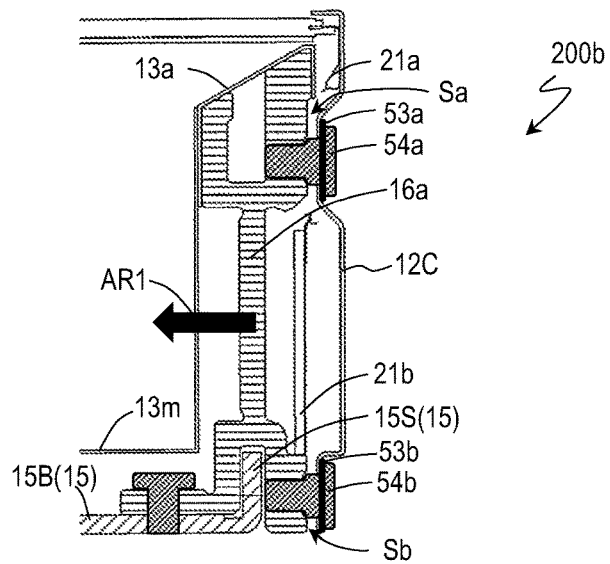
FIG. 10B is a schematic partial cross-sectional view of the liquid crystal display module 200b (low temperature).
Figure 10C:
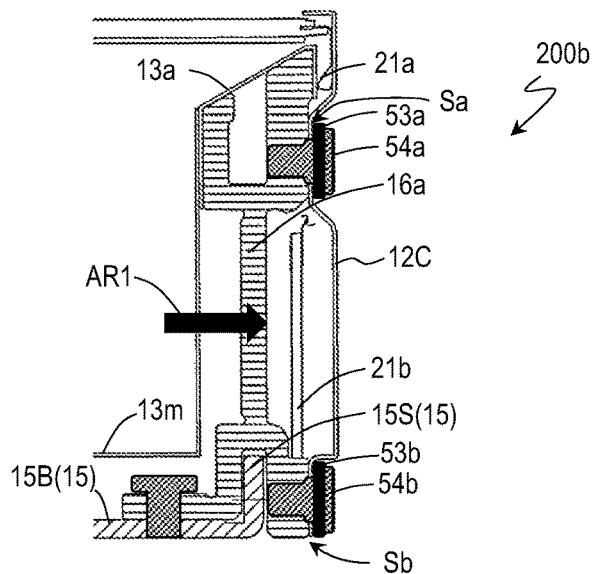
FIG. 10C is a schematic partial cross-sectional view of the liquid crystal display module 200b (high temperature).

Next, with reference to FIGS. 10A, 10B and 10C, the structure of a liquid crystal display module 200b according to an embodiment of the present invention will be described. FIGS. 10A, 10B and 10C correspond to the neighborhood of a plate-like member 12C of a bezel 12C (note that the same reference numeral 12C is used for both the bezel and the plate-like member of the bezel). FIG. 10A shows a state of the liquid crystal display module 200b at room temperature; FIG. 10B shows its state at a low temperature which is lower than room temperature; and FIG. 10C shows its state at a high temperature which is higher than room temperature.

Each plate-like member 12C of the bezel 12C of the liquid crystal display module 200b is a monolithically-formed plate-like member, having throughholes in which stepped screws are inserted to fix the plate-like member 12C to the frame 16, each with a spring member interposed therebetween. Herein, each of an upper portion and a lower portion of the plate-like member 12C has a throughhole; a stepped screw 54a inserted in the throughhole of the upper portion causes the plate-like member 12C to be fixed to the wall member 16a of the frame, with a spring member 53a interposed therebetween; and a stepped screw 54b inserted in the throughhole of the lower portion causes the plate-like member 12C to be fixed to the wall member 16a of the frame, with a spring member 53b interposed therebetween. A cross-sectional view of the stepped screw 54a, 54b of the liquid crystal display module 200b is schematically shown in FIG. 11.

The liquid crystal display module 200b shown in FIG. 10A is in an environment at room temperature. When a structure is adopted in which the plate-like member 12C of the bezel is utilized to retain the liquid crystal panel 10, the spring members 53a and 53b serve to adjust, to an appropriate magnitude, the stress that is associated with the liquid crystal panel 10 being pressed by the plate-like member 12C at point H. This stress corresponds to Pressurization 2 in FIG. 12, for example. Herein, moderate spaces Sa and Sb are respectively created between the wall member 16a of the frame and the plate-like member 12C. However, if the fixed points are wide apart or the panel size is small, the space Sb is not necessarily needed, and the spring member 53b for the lower portion of the plate-like member 12C may be omitted (and instead a usual screw may be used for fixing). In the case where the liquid crystal display module is thin, the lower stepped screw 54b may be omitted.

The liquid crystal display module 200b shown in FIG. 10B is in an environment at a lower temperature than room temperature, where contraction of the back chassis 15 has caused the wall member 16a of the frame 16 to be displaced in the direction of arrow AR1 relative to the liquid crystal panel 10. As a result of this, the spring members 53a and 53b are crushed by the heads of the stepped screws 54. This stress corresponds to Pressurization 3 in FIG. 12, for example. Herein, the spaces Sa and Sb between the wall member 16a of the frame and the plate-like member 12C are enlarged. Since crushing of the spring members 53a and 53b absorbs the amount of contraction of the back chassis 15, an increase in the stress of pressing the liquid crystal panel 10 at point H is suppressed. As a result, displaying problems (e.g., white dots) caused by any compressive stress due to the difference in the coefficient of thermal expansion are suppressed.

The liquid crystal display module 200b shown in FIG. 10C is in an environment at a higher temperature than room temperature, where expansion of the back chassis 15 has caused the wall member 16a of the frame 16 to be displaced in the direction of arrow AR1 relative to the liquid crystal panel 10. The spring members 53a and 53b are closer to being free. This stress corresponds to Pressurization 1 in FIG. 12, for example. Herein, the spaces Sa and Sb between the wall member 16a of the frame and the plate-like member 12C have disappeared. Even if the stepped screws 54a and 54b are displaced in a direction away from the bezel 12C, the spring members 53a and 53b keep pressing the bezel 12C, so that interspaces are restrained from emerging between the bezel 12C and the liquid crystal panel 10 (as indicated at G in FIG. 10A). As a result, a light leak ascribable to the difference in the coefficient of thermal expansion is suppressed.

Even if the back chassis 15B expands at this time, the plate-like member 12C being squeezed where the stepped screws 54a and 54b are fixed (see FIG. 11) prevents the heads of the stepped screws 54a and 54b from protruding from the side surface of the liquid crystal display module 200b as defined by the bezel 12C. The depth of the drawing process or Z-bending step is set to be larger than the displacement due to thermal expansion.

Figure 12:
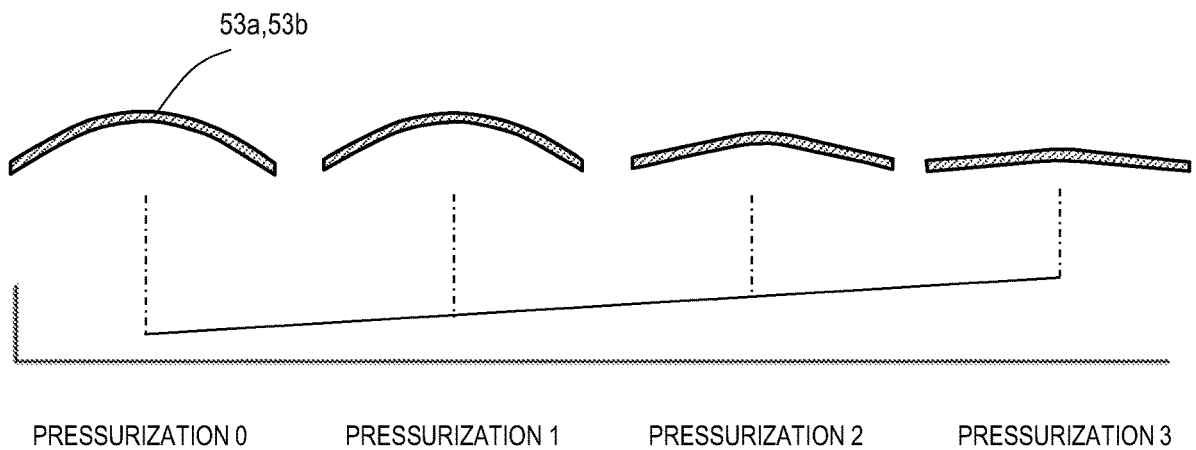
FIG. 12 is a diagram schematically showing a relationship between the load and the degree of deformation of the spring members 53a and 53b.

FIG. 12 schematically shows a relationship between the load and the degree of deformation of the spring members 53a and 53b. The more flat the spring members 53a and 53b become, the greater the load (reaction force) becomes. Preferably, the change in load relative to deformation of the spring members 53a and 53b is sufficiently small, while being able to sufficiently restrain the stress of pressing the liquid crystal panel 10 at point H.

Figure 13:
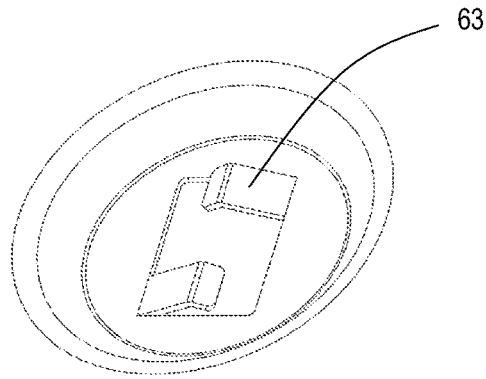
FIG. 13 is a schematic perspective view of a site of screw fixture featuring a sheet spring.

As the spring members 53a and 53b, for example, any known spring members such as corrugated washers, spring washers, or coil springs can be suitably used. Coil springs would also provide similar effects. In the case where the plate-like member 12C of the bezel 12C has sufficient elasticity, sites of screw fixtures featuring sheet springs 63 can be employed, as shown in FIG. 13. Moreover, the elastic modulus of the bezel 12C may be adjusted so as to utilize the elasticity of the bezel itself; this makes it unnecessary to separately provide any spring members.

Figure 14:
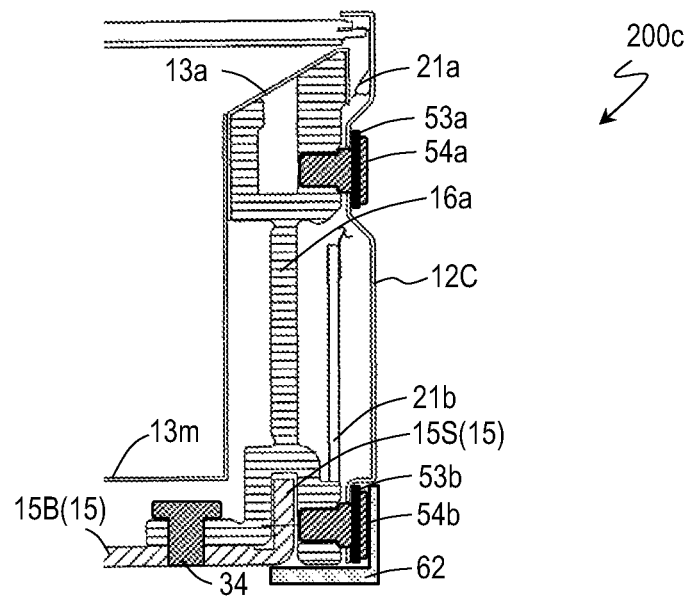
FIG. 14 is a schematic partial cross-sectional view of a liquid crystal display module 200c according to an embodiment of the present invention.

FIG. 14 shows a schematic partial cross-sectional view of a liquid crystal display module 200c according to an embodiment of the present invention. The liquid crystal display module 200c is based on the above-described liquid crystal display module 200b, but further includes a corner-protecting member 62 that covers the interspace between each of the four independent plate-like members 12C of the bezel 12C and the back chassis 15.

When the stepped screw 53b is provided as in the liquid crystal display module 200b, an interspace (e.g., the interspace Sb in FIG. 10A) may be created between the back chassis 15 and the plate-like member 12C. In order to prevent dust intrusion through any such interspace, it is preferable to provide the corner-protecting member 62. Preferably, the corner-protecting member 62 has enough elasticity to tolerate the thermal expansion/thermal contraction of the back chassis 15, and may be made of a rubber (including elastomers), for example.

The corner-protecting member 62 may be annular, for example. Alternatively, the corner-protecting member 62 may be a rectangular piece being bent in an L shape and attached onto each of the four sides, for example. In this case, at each corner, two L-shaped pieces are disposed so as to overlap each other.

Instead of or in addition to the corner-protecting member 62, cushioning may be inserted in the interspace Sb between the frame 16 and the bezel 12C in a manner of being sandwiched.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A liquid crystal display module comprising:
   a liquid crystal panel;
   a back chassis having a bottom that supports a substrate, the substrate having a plurality of light sources disposed thereon;
   a frame having four independent wall members respectively extending in parallel to four sides of the liquid crystal panel and each being fixed at a perimeter of the back chassis, the frame supporting the liquid crystal panel;
   a bezel having four independent plate-like members disposed so as to surround the four sides of the liquid crystal panel and the four independent wall members of the frame;
   an optical film laminate disposed between the liquid crystal panel and the frame, and being attached onto a rear face of the liquid crystal panel;
   a first reflective sheet having four side faces opposed to the four independent wall members of the frame, and having a bottom face that has a plurality of apertures through which the plurality of light sources are respectively exposed; and
   four independent second reflective sheets disposed between the liquid crystal panel and the respective four independent wall members of the frame.

2. The liquid crystal display module of claim 1, wherein the four independent wall members have mutually congruent cross-sectional shapes.

3. The liquid crystal display module of claim 1, wherein the first reflective sheet and the four independent second reflective sheets are overlaid upon one another on the four independent wall members.

4. The liquid crystal display module of claim 1, wherein an end portion of each of the four independent wall members has a 45° beveled face, and is fixed so that the beveled faces of two adjacent wall members are opposed to each other.

5. The liquid crystal display module of claim 1, wherein, in each of the four corners created by two adjacent wall members among the four independent wall members, an end portion of one of the wall members is disposed in the other wall member.

6. The liquid crystal display module of claim 1, wherein the four independent plate-like members of the bezel are each configured so that, when a lower portion that is directly in contact with or indirectly fixed to the frame is displaced, an amount of displacement of an upper portion that is directly in contact with or indirectly fixed to the liquid crystal panel is smaller than an amount of displacement of the lower portion.

7. The liquid crystal display module of claim 6, wherein the upper portion and the lower portion of each of the four independent plate-like members of the bezel are two mutually independent plate members being adhesively bonded to each other via an elastic member.

8. The liquid crystal display module of claim 1, wherein each of the four independent plate-like members of the bezel is a monolithically-formed plate-like member having a throughhole, the plate-like member being fixed to the frame with a stepped screw that is inserted in the throughhole with a spring member interposed therebetween.

9. The liquid crystal display module of claim 1, further comprising a corner-protecting member covering an interspace between the four independent plate-like members of the bezel and the back chassis.

10. The liquid crystal display module of claim 9, wherein the corner-protecting member is made of a rubber.

11. The liquid crystal display module of claim 1, wherein each of the four independent second reflective sheets is arranged to cover an upper top end of a corresponding wall member among the four independent wall members, and
the liquid crystal panel is supported by the four independent wall members through the four independent second reflective sheets.

\* \* \* \* \*